United States Patent [19]

Muller

[11] Patent Number: 4,677,744
[45] Date of Patent: Jul. 7, 1987

[54] APPARATUS FOR ASSEMBLING A ROTATABLE ASSEMBLY

[75] Inventor: Alexander Muller, Holland, Mich.

[73] Assignee: General Electric Company, Fort Wayne, Ind.

[21] Appl. No.: 841,985

[22] Filed: Mar. 20, 1986

Related U.S. Application Data

[60] Division of Ser. No. 630,872, Jul. 13, 1984, Pat. No. 4,587,721, which is a continuation-in-part of Ser. No. 616,200, Jun. 1, 1984, Pat. No. 4,586,244, which is a continuation-in-part of Ser. No. 593,840, Mar. 27, 1984, Pat. No. 4,608,752.

[51] Int. Cl.$^4$ ............................................. B23P 19/04
[52] U.S. Cl. ........................................ 29/729; 29/732; 29/759
[58] Field of Search .................. 29/729, 598, 732, 759, 29/33 K, 33 L, 464, 465; 72/452; 254/104; 269/234, 217

[56] References Cited

U.S. PATENT DOCUMENTS

| | | | |
|---|---|---|---|
| 3,221,194 | 11/1965 | Blackburn | 310/156 |
| 3,531,670 | 9/1970 | Loudon | 310/156 |
| 3,901,356 | 8/1975 | Butler | 254/104 |
| 4,059,898 | 11/1977 | Adair | 29/598 |
| 4,199,861 | 4/1980 | Buckman et al. | 310/42 |
| 4,316,605 | 2/1982 | Zachry et al. | 29/744 |
| 4,351,103 | 9/1982 | Rodenbeck | 29/732 |
| 4,352,284 | 10/1982 | Woods | 72/452 |
| 4,426,869 | 1/1984 | Farmer et al. | 72/452 |
| 4,427,911 | 1/1984 | Manson | 310/156 |
| 4,443,934 | 4/1984 | Hickey | 29/732 |
| 4,449,289 | 5/1984 | Kindig | 29/732 |

FOREIGN PATENT DOCUMENTS

| | | | |
|---|---|---|---|
| 19369 | 2/1981 | Japan | 310/152 |
| 664902 | 1/1952 | United Kingdom | 310/156 |

Primary Examiner—Percy W. Echols
Attorney, Agent, or Firm—Ralph E. Krisher, Jr.

[57] ABSTRACT

Apparatus has a support, and means is associated with the support for reciprocal movement. Resilient means is operable for opposing the movement in one direction of the reciprocal movement means, and wedge means conjointly movable with the reciprocal movement means is also arranged for pivotal movement with respect thereto. Means is associated with the wedge means and the reciprocal movement means for accommodating both the pivotal movement and the conjoint movement of the wedge means with the reciprocal movement means.

7 Claims, 19 Drawing Figures

SEGMENTS
ARC
LENGTHS
120°
120°
120°
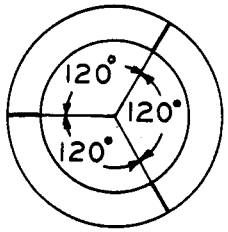
GAPS → 0,0,0   FIG. 11A
PRIOR ART
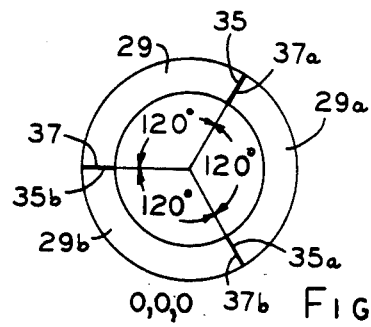
0,0,0   FIG. 12A
117°
120°
117°
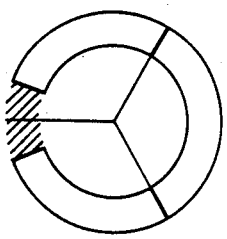
GAPS → 6,0,0   FIG. 11B
PRIOR ART
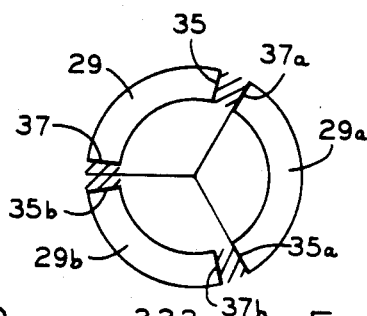
2,2,2   FIG. 12B
120°
120°
117°
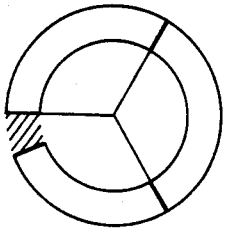
GAPS → 3,0,0   FIG. 11C
PRIOR ART
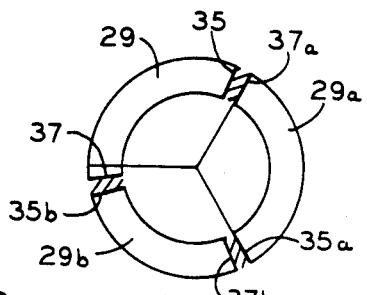
1,1,1   FIG. 12C
117°
117°
117°
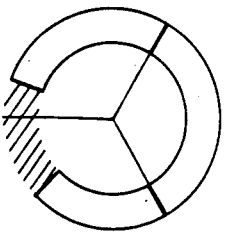
GAPS → 9,0,0   FIG. 11D
PRIOR ART
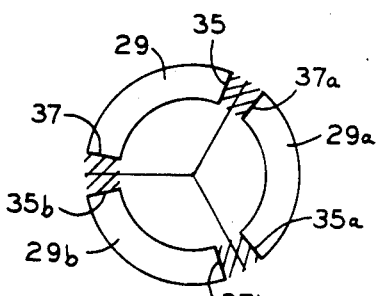
3,3,3   FIG. 12D

APPARATUS FOR ASSEMBLING A ROTATABLE ASSEMBLY

CROSS-REFERENCE TO RELATED APPLICATIONS

This application is a division of parent application Ser. No. 630,872 filed July 13, 1984 (now U.S. Pat. No. 4,587,721 issued May 13, 1986) which is continuation-in-part of application Ser. No. 616,200 filed June 1, 1984 (now U.S. Pat. No. 4,586,244 issued May 6, 1986) which in turn is a continuation-in-part of application Ser. No. 593,840 filed Mar. 27, 1984 (now U.S. Pat. No. 4,608,752 issued Sept. 2, 1986), and the disclosures of applications Ser. No. 630,872, Ser. No. 616,200 and Ser. No. 592,840 are incorporated herein by reference.

FIELD OF THE INVENTION

This application relates in general to dynamoelectric machines and in particular to an improved apparatus for assembling a rotatable assembly adapted for use in a dynamoelectric machine.

BACKGROUND OF THE INVENTION

In the past, various different methods have been utilized to secure arcuate shaped magnet material elements formed of a frangible material to a circumferential surface of a rotor core. In one of these past methods, the rotor core was provided with protrusions which were associated in displacement preventing engagement with the arcuate magnet material elements thereby to maintain them in place seated against the circumferential surface of the rotor core. In another of the past methods, a fiber, plastic or metallic wrap or sleeve was provided enveloping at least the arcuate outer surfaces of the magnet material elements thereby to maintain the magnet material elements against displacement from their seated engagement with the circumferential surface of the rotor core.

In still another of the aforementioned past methods of securing arcuate magnet material elements to a rotor core, a hardenable adhesive material was applied to at least one of the circumferential surface of the rotor core and the arcuate inner surfaces of the magnet material elements. After such application of the hardenable adhesive material, the arcuate inner surfaces of the magnet material elements were seated or abutted against the circumferential surface of the rotor core, and in this position, the permanent magnet material elements and the circumferential surface of the rotor core were merely clamped together until the hardenable adhesive material set or hardened thereby to adhere together the magnet material elements and the circumferential surface of the rotor core. Since both the arcuate inner surfaces of the magnet material elements and the circumferential surface of the rotor core may have high points or areas due to tolerance variations during the manufacture thereof, the arcuate inner surfaces of magnet material elements and the circumferential surface rotor core were at least in part in surface-to-surface engagement with each other; due at least in part to such aforementioned surface-to-surface engagement, it is believed that one of the disadvantageous or undesirable features of this past method was that some of the frangible arcuate magnet material elements fractured or cracked when pressure or force was applied thereto to clamp them against the rotor core. Since the high points or areas on the arcuate inner surfaces of the magnet material elements and the circumferential surface of the rotor core effected by the aforementioned tolerance variations were clamped directly into the aforementioned surface-to-surface engagement another disadvantageous or undesirable features of this past method is believed to be dependable, uniform bond strengths of the hardenable adhesive material could not be attained between the arcuate inner surfaces of the magnet material elements and the circumferential surface of the rotor core. Due to this nonuniformity of bond strength, it is also believed that the rotor assemblies fabricated by this past method may have been acceptable for use in low speed motor applications, such as ceiling fans for instance, but might not have been unacceptable in relatively high speed motor applications, such as clothes washers and various hermetic motor applications for instance. Additionally, it is further believed that another disadvantageous or undesirable feature of rotatable assemblies fabricated by the past method was that the outside diameter or circumference thereof was not constant since the radial distance between the circumferential surface of the rotor core and the arcuate outer surface of each permanent magnet material element may have varied due to the aforementioned tolerance buildup therebetween. While the prior art rotatable assemblies believed to have the above discussed disadvantageous feature may have been acceptable for some relatively low speed motor applications, it is believed that they may have been too far out of balance for use in a motor application of relatively high speeds, say for instance, at least about nine thousand revolutions per minute (9000 rpm) or above. Also with respect to the prior art rotatable assemblies believed to have the above discussed disadvantageous feature, it is believed that a flux gap between a stator bore and the outer arcuate surfaces of the permanent magnet material elements on such prior art rotatable assemblies may have been deleteriously affected. Furthermore, it is also believed that another disadvantageous or undesirable feature of rotatable assemblies manufactured by this past method was that the arc lengths of the permanent magnet material elements may not have been evenly distributed about the circumferential surface of the rotor core thereby also to effect a too far out of balance rotatable assembly for use in the aforementioned higher speed motor applications.

SUMMARY OF THE INVENTION

Among the several objects of the present invention may be noted the provision of an improved apparatus for assembling a rotatable assembly which overcomes the above discussed disadvantageous or undesirable features, as well as others, of the prior art; the provision of such improved apparatus in which at least generally equal gaps are provided between adjacent ones of a set of generally arcuate magnet material elements disposed about a circumferential surface of a rotatable member of the rotatable assembly irrespective of any difference in the arcuate lengths of the magnet material elements within preselected tolerance limits therefor; the provision of such improved apparatus in which positioning means for engagement with the adjacent opposed ones of the opposite marginal edges of the magnet material elements are operated thereby from located positions in the apparatus toward adjusting positions to establish the at least generally equal gaps between the adjacent opposed ones of the opposite marginal edges of the magnet material elements; the provision of such improved and apparatus in which the arcuate lengths of the magnet material are evenly distributed about the rotatable member; the provision of such improved rotatable assembly having accurate spin balance characteristics; the provision of such improved rotatable assembly in which the outer arcuate surfaces of the magnet material elements define a preselected diameter of the rotatable assembly, the arcuate inner surfaces of the magnet material elements are spaced in preselected spatial relation with at least one rotatable member of the rotatable assembly, and equal gaps are provided between adjacent ones of opposite marginal edges of the magnet material elements which are interposed between the arcuate inner and outer surfaces, respectively; and the provision of such improved apparatus in which the components utilized therein are simple in design, easily assembled and economically manufactured. These as well as other objects and advantageous features of the present invention will be in part apparent and in part pointed out hereinafter.

In general, apparatus in one form of the invention has a support and means associated with the support and adapted for reciprocal movement in one direction and another direction opposite the one direction. Resilient means is operable generally for opposing the movement of the reciprocal movement means in one of the one and another directions, and wedge means is adapted for conjoint movement with the reciprocal movement means and for pivotal movement relative to the reciprocal movement means. Means is associated with the wedge means and the reciprocal movement means for accommodating both the pivotal movement of the wedge relative to the reciprocal movement means and the conjoint movement of the wedge means with the reciprocal movement means.

BRIEF DESCRIPTION OF THE DRAWINGS

FIGS. 11A–11D and 12A–12D are schematic representations illustrating the spacing of the gaps which may occur due to tolerance variation in the arcuate lengths of the magnet material elements when the magnet material elements are predeterminately located with respect to the rotatable member in the present invention as compared with such gaps which may occur in the prior art assembly of magnet material elements to the rotatable member without such predetermined location, respectively.

Corresponding reference characters indicate corresponding parts throughout the several views of the drawings.

The exemplifications set out herein illustrate the preferred embodiments of the invention in one form thereof, and such exemplifications are not to be construed as limiting either the scope of the disclosure or the scope of the invention in any manner.

DETAILED DESCRIPTION OF THE PREFERRED EMBODIMENTS

Figure 1:
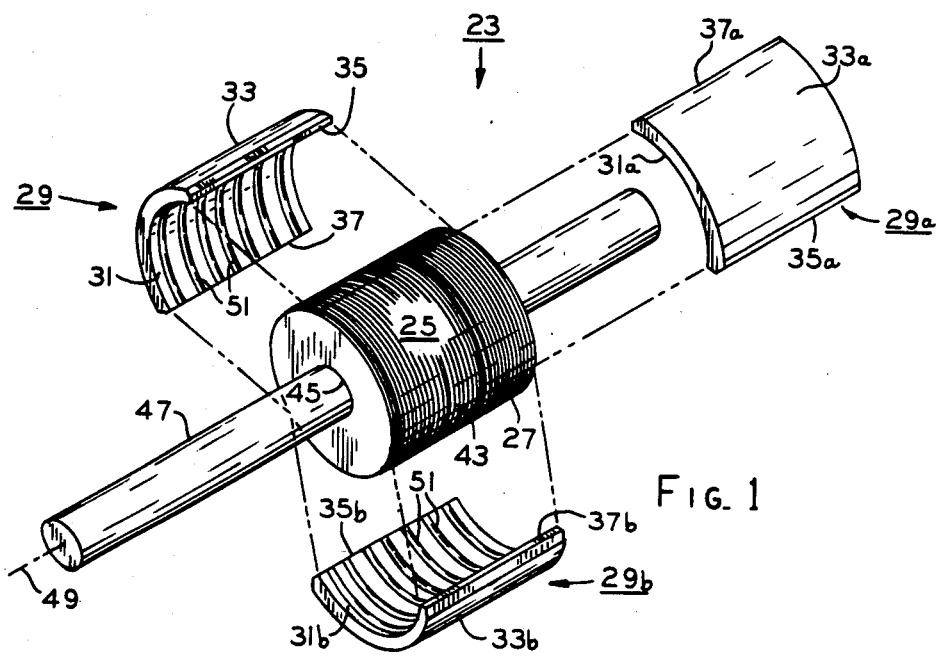
FIG. 1 is an exploded isometric view of a rotatable assembly.
Figure 3:
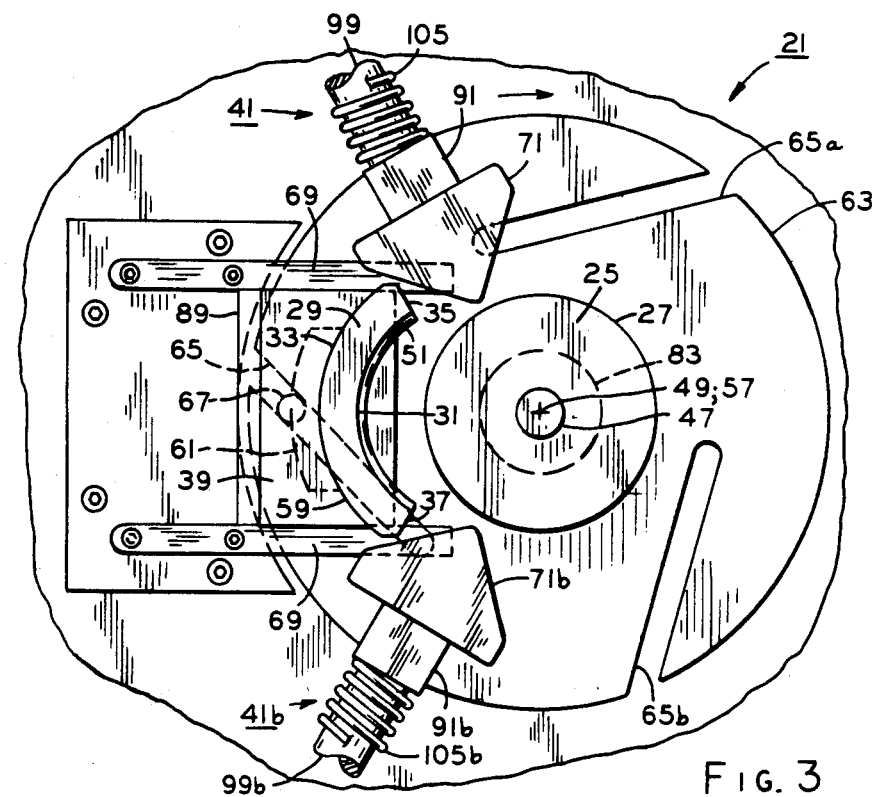
FIG. 3 is an enlarged partial plan view taken from FIG. 2 illustrating only one of the receiving means for one of the magnet material elements in an at-rest position thereof.
Figure 2:
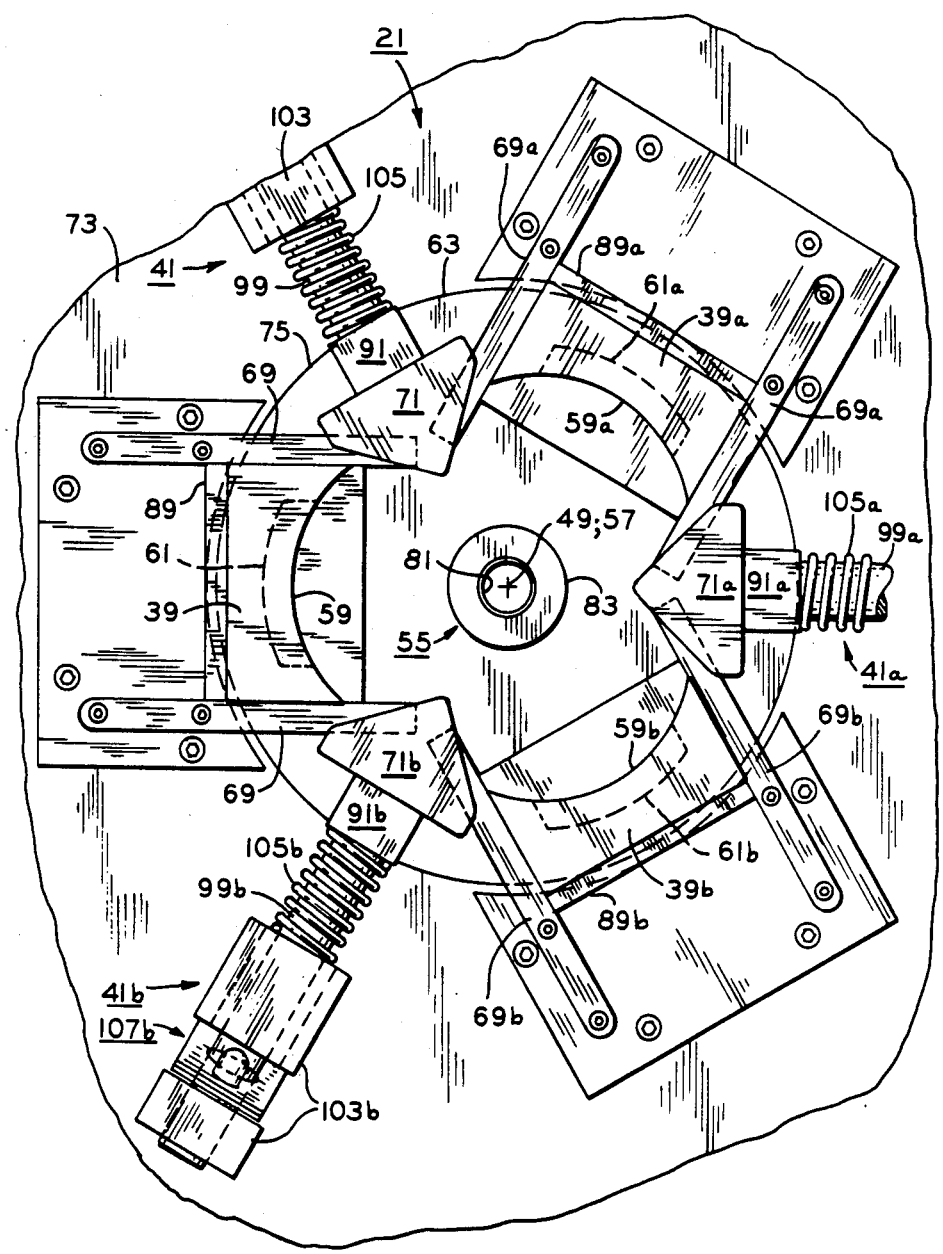
FIG. 2 is a plan view partially in section showing apparatus for assembling the rotatable assembly of FIG. 1 and also illustrating principles which may be utilized in a method of operating the apparatus and a method of assembling a rotatable assembly, respectively.
Figure 4:
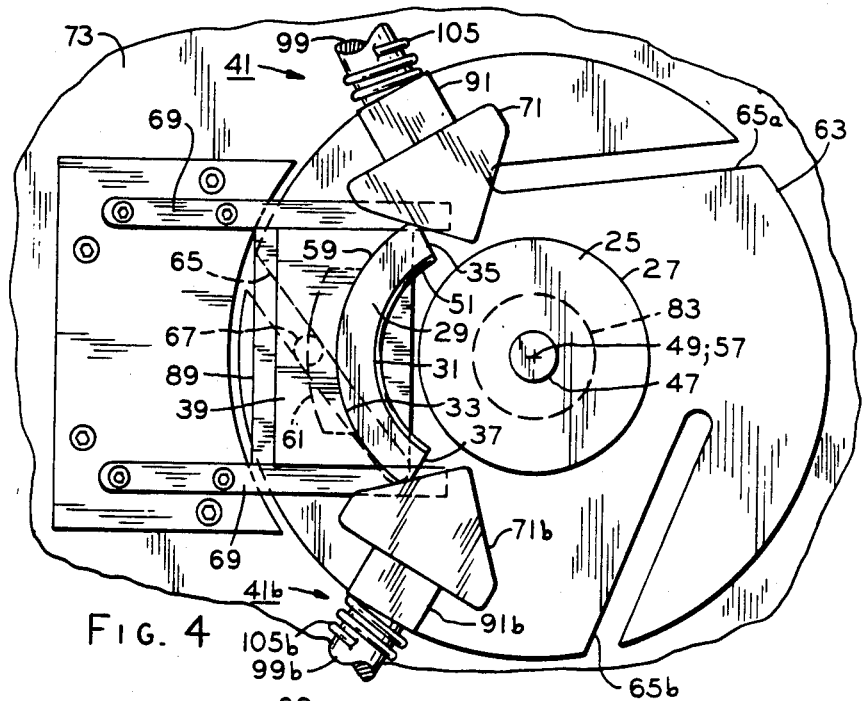
FIG. 4 is generally the same as FIG. 3 but showing the receiving means advanced toward a position engaging the opposite marginal edges of the magnet material element with wedge means in the at-rest positions thereof.
Figure 5:
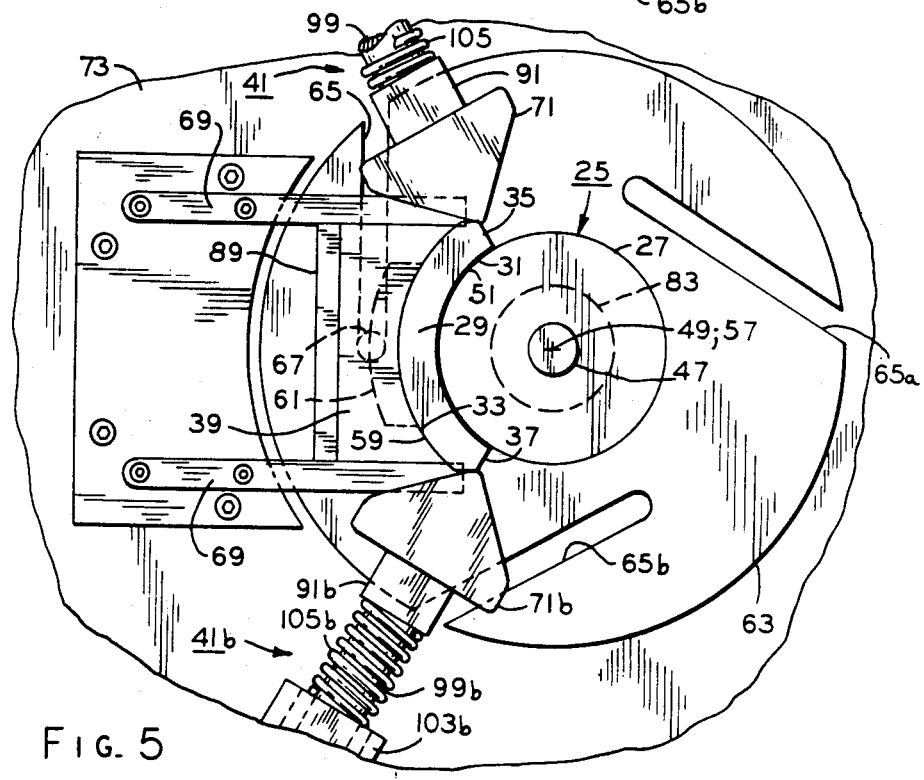
FIG. 5 is generally the same as FIG. 4 but showing the receiving means advanced into the assembly position thereof with the wedge means actuated to the adjusting position thereof.
Figure 6:
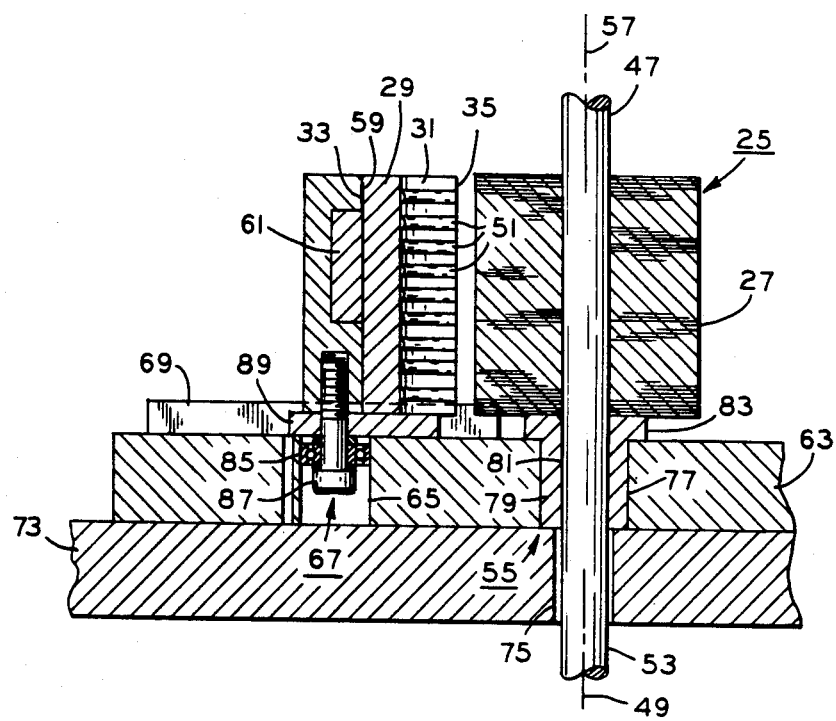
FIG. 6 is an enlarged sectional view taken along line 6—6 in FIG. 5.
Figure 7:
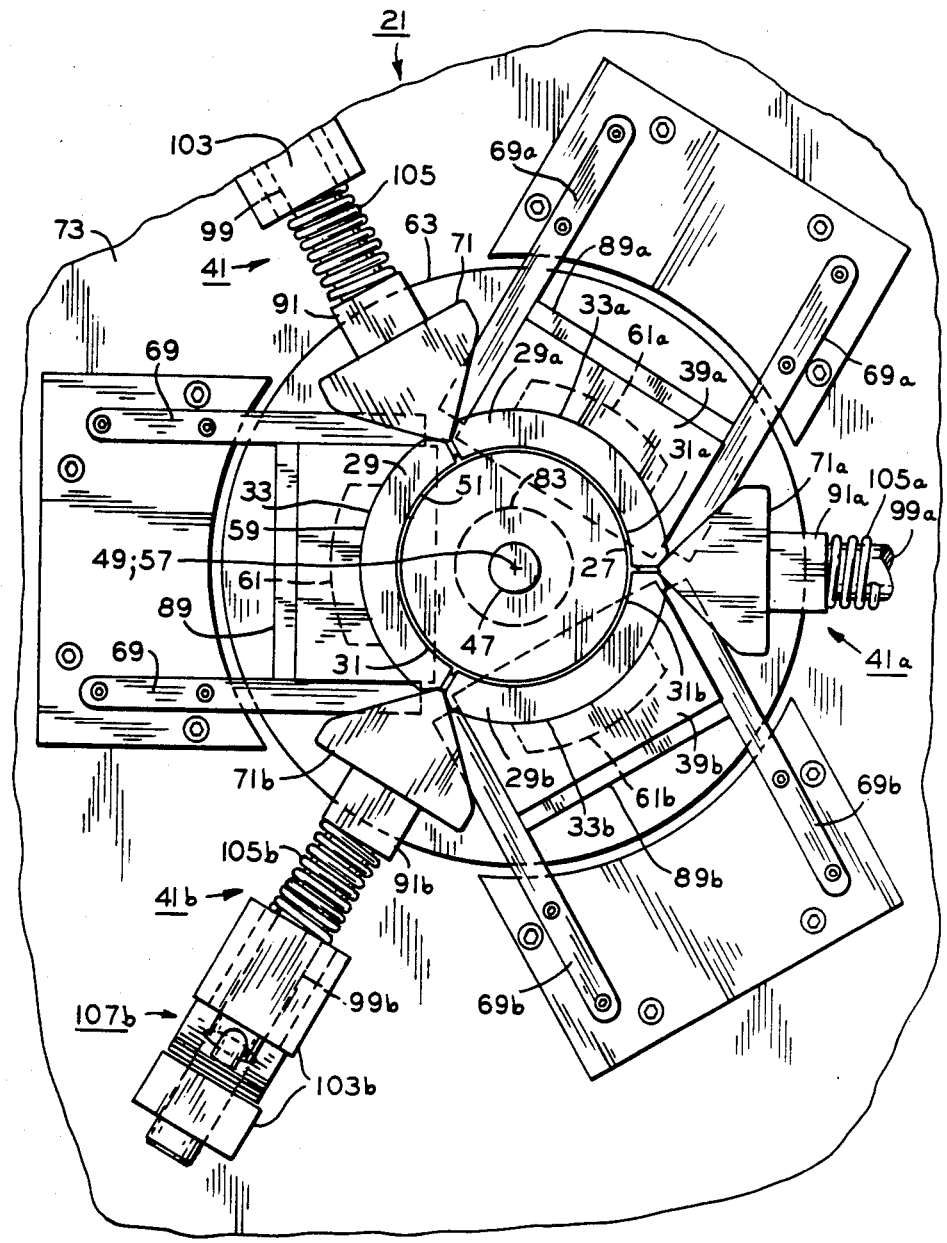
FIG. 7 is the same as FIG. 2 but showing the receiving means of the apparatus actuated into the assembly positions thereof.

With reference to the drawings in general, there is illustrated a method of operating apparatus 21 for assembling a rotatable assembly 23 adapted for use in a dynamoelectric machine (not shown) (FIGS. 1–10). Rotatable assembly 23 includes at least one rotatable member, such as for instance a rotor core 25 or the like, having a circumferential surface 27 and a set of magnet material elements 29, 29a, 29b having generally arcuate inner and outer surfaces 31, 31a, 31b and 33, 33a, 33b interposed between a pair of generally opposite marginal edges 35, 35a, 35b and 37, 37a, 37b of the magnet material elements generally defining arcuate lengths thereof within preselected tolerance limits (FIG. 1), respectively. The arcuate lengths of at least one of magnet material elements 29, 29a, 29b is different than that of at least another of the magnet material elements within the preselected tolerance limits. Apparatus 21 includes a set of means, such as holders 39, 39a, 39b or the like for instance, for receiving magnet material elements 29, 29a, 29b and a set of means, as indicated generally at 41, 41a, 41b, positioning engagement with the magnet material elements, respectively (FIG. 2). In practicing this method, the at least one rotatable member or rotor core 25 is disposed in a preselected position therefor in apparatus 21, and magnet material elements 29, 29a, 29b are placed or received in receiving means or holders 39, 39a, 39b therefor with the arcuate lengths of the magnet material elements extending generally circumferentially with respect to circumferential surface 27 of rotor core 25 in the preselected position thereof, respectively (FIGS. 2 and 3). Holders 39, 39a, 39b are moved toward assembly positions with respect to rotor core 25, and the adjacent opposed ones of opposite marginal edges 35, 35a 35b and 37, 37a, 37b of magnet material elements 29, 29a, 29b are engaged with positioning means 41, 41a, 41b, respectively (FIGS. 4 and 7). The arcuate lengths of magnet material elements 29, 29a, 29b are centered between positioning means 41, 41a, 41b in response to the engagement thereof with the adjacent opposed ones of opposite marginal edges 35, 35a, 35b and 37, 37a, 37b of the magnet material elements, and the positioning means are displaced toward adjusting positions in response to continued movement of holders 39, 39a, 39b toward the assembly positions thereof, respectively (FIGS. 5-7). At least generally equal gaps G are established between the adjacent opposed ones of the opposite marginal edges 35, 35a, 35b and 37, 37a, 37b of magnet material elements 29, 29a, 29b engaged with positioning means 41, 41a, 41b in the adjusting positions thereof; and thereby the arcuate length difference between the at least one of the magnet material elements and the at least another of the magnet material elements is compensated, respectively (FIGS. 12A-12D).

More particularly and with specific reference to FIG. 1, rotor core 25 of rotatable assembly 23 includes a plurality of rotor laminations 43 which may be interconnected into a stack thereof by suitable means well known to the art, such as welding or an interlocking tab construction or the like for instance (not shown), thereby to form the rotor core having generally cylindric circumferential surface 27 thereon. An opening or bore 45 through the lamination stack of rotor core 25 may be mounted or otherwise secured about a shaft 47 by suitable means, such as for instance heat shrinking or press-fitting or the like, and the rotor core and shaft have a rotational axis 49. While rotor core 25 is illustrated herein for purposes of disclosure, it is contemplated that various other rotor cores having various different constructions, such as a solid metallic core, a centered iron core, or an edgewise wound strip core for instance, and mounted onto a shaft by various other methods or constructions may be utilized within the scope of the invention so as to meet at least some of the objects thereof.

In a preferred form of the invention, a preselected amount of a hardenable adhesive material 51 is applied in the illustrated beaded pattern thereof onto arcuate inner surfaces 31, 31a, 31b of magnet material elements 29, 29a, 29b prior to the disposition thereof in apparatus 21, and an activator (not shown) for the hardenable adhesive material may be applied by suitable means, such as spraying or the like for instance, onto circumferential surface 27 of rotor core 25 when it is mounted in the apparatus, as discussed in greater detail hereinafter. While hardenable adhesive material 51 and activator therefor discussed herein is Loctite 325 available from Loctite Corporation, Newington, Conn., it is contemplated that various other hardenable adhesive materials may be utilized with or without activators within the scope of the invention so as to meet at least some of the objects thereof. Furthermore, although hardenable adhesive material 51 is illustrated herein as applied in a preselected amount and in a beaded pattern onto magnet material elements 29, 29a, 29b, it is contemplated that random amounts of the hardenable adhesive material may be utilized and that the hardenable adhesive material may be applied in various other patterns or in a coat thereof onto either the magnet material elements or the circumferential surface of the rotor core or both within the scope of the invention so as to meet at least some of the objects thereof.

An end portion 53 of shaft 47 is manually placed or otherwise associated in locating engagement with a mounting device or mounting means 55 of apparatus 21, and the locating engagement of the shaft end portion with the mounting device at least generally aligns rotational axis 49 of rotor core 25 and shaft 47 with a preselected reference axis 57 of apparatus 21 defined by the mounting device, as best seen in FIG. 6. In this manner, circumferential surface 27 of rotor core 25 is disposed generally coaxially about preselected reference axis 57 in apparatus 21 and arranged generally concentrically in radially spaced relation with a set of another arcuate seats or surfaces 59, 59a, 59b on holders 39, 39a, 39b when the holders are in the retracted or at-rest positions thereof, as best seen in FIGS. 2 and 3. It may be noted that the arcs or curvatures of arcuate seats 59, 59a, 59b are predeterminately arranged to define the predetermined outside diameter D of rotatable assembly 23 when holders 39, 39a, 39b are in their advanced or assembly positions locating the seats with respect to each other and as best seen in FIGS. 5 and 7, as discussed in greater detail hereinafter.

With hardenable adhesive material 51 applied onto arcuate inner surfaces 31, 31a, 31b of magnet material elements 29, 29a, 29b, as previously discussed, the magnet material elements are manually placed or arranged in holders 39, 39a, 39b when the holders are in the retracted positions thereof, respectively, as best seen in FIGS. 2 and 3; however, only one of the holders and magnet material elements is illustrated in FIGS. 3-7 for purposes of drawing simplicity, and the others are discussion in conjunction therewith hereinafter. Upon the placement of magnet material elements 29, 29a, 29b into holders 39, 39a, 39b therefor, arcuate outer surfaces 33, 33a, 33b of the magnet material elements are disposed at least adjacent arcuate seats 59, 59a, 59b in facing or surface-to-surface engagement or relation therewith, and arcuate inner surfaces 31, 31a, 31b of the magnet material elements are disposed in facing relation with circumferential surface 27 of rotor core 25 in its preselected located position with rotational axis 49 of rotor core 25 and shaft 47 aligned with preselected reference axis 57 of apparatus 21, respectively. Means, such as a set of permanent magnets 61, 61a, 61b or the like for instance, are associated with holders 39, 39a, 39b for magnetic attraction or magnetic coupling relation with magnet material elements 29, 29a, 29b thereby to insure or maintain the surface-to-surface relation of arcuate outer surfaces 33, 33a, 33b on the magnet material elements with arcuate seats 59, 59a, 59b therefor on the holders, respectively; however, while the permanent magnets are illustrated herein for purposes of disclosure, it is contemplated that various other means may be associated with the holders for retaining the magnet material elements in the seated positions thereof on the holders within the scope of the invention so as to meet at least some of the objects thereof. Although magnet material elements 29, 29a, 29b are disclosed herein as being manually placed into holders 39, 39a, 39b therefor, it is contemplated that various different transfer or robotic devices may be associated with apparatus 21 for automatically loading or feeding the magnetic material elements into the holders therefor within the scope of the invention so as to meet at least some of the objects thereof.

Magnet material elements 29, 29a, 29b may be formed of a frangible ferrite ceramic material and are available from Crucible Magnetics Division of Colt Industries, Elizabethtown, Ky. While magnet material elements 29, 29a, 29b are illustrated herein for purposes of disclosure, it is contemplated that various other magnet material elements of different sizes and configurations and formed of different materials may be utilized within the scope of the invention so as to meet at least some of the objects thereof. Further, in a preferred form of the invention, magnet material elements 29, 29a, 29b are not permanently magnetized until after the assembly of rotatable assembly 23 is completed. It may be noted that the curvature or radius of arcuate locating surfaces 59, 59a, 59b of holders 39, 39a, 39b generally correspond to those of arcuate outer surfaces 33, 33a, 33b of magnet material elements 29, 29a, 29b, and the arcuate lengths of the arcuate locating surfaces are less than the arcuate lengths of the magnet material elements.

Upon the loading of magnet material elements 29, 29a, 29b into holders 39, 39a, 39b therefor, as discussed above, a cam plate 63 may be selectively rotated or actuated in a clockwise direction, as illustrated by the directional arrow in FIG. 3, thereby to effect the actuation or movement of the holders from the at-rest positions toward the assembly positions thereof. In response to this rotation of cam plate 63, a set of cams or cam means, such as for instance cam slots or grooves 65, 65a, 65b or the like, associated with the cam plate are drivingly engaged with a set of cam followers 67, 67a, 67b associated with holders 39, 39a, 39b thereby to move the holders from their at-rest positions generally radially with respect to preselected reference axis 57 of apparatus 21 toward the assembly positions of the holders, respectively. While cam plate 39, cams 65, 65a, 65b, and cam followers 67, 67a, 67b of holders 39, 39a, 39b are illustrated herein for effecting the movement of the holders between their at-rest and assembly positions, it is contemplated that other means may be employed for effecting such movement of the holders within the scope of the invention so as to meet at least some of the objects thereof. Of course, a set means, such as pairs of spaced apart tracks or guides 69, 69a, 69b or the like for instance, are associated in sliding engagement with holders 39, 39a, 39b for guiding them generally radially with respect to preselected reference axis 57 of apparatus 21, respectively. Upon this cam driven movement of holders 39, 39a, 39b, the adjacent opposed ones of opposite marginal edges 35, 35a, 35b and 37, 37a, 37b of magnet material elements 29, 29a, 29b carried in the holders are initially engaged with a set of wedges or wedge means 71, 71a, 71b of positioning means 41, 41a, 41b in the at-rest or locating positions thereof, as may be seen in FIG. 4, and in response to such engagement, the arcuate lengths of the magnet material elements are centered between the wedges, respectively. It may be noted that in response to the aforementioned caging or centering engagement between the adjacent opposed ones of opposite marginal edges of magnet material elements 29, 29a, 29b and wedges 71, 71a, 71b, the centers of the arcuate lengths of the magnet material elements are not only centered between the wedges but also are centered or aligned with the centers of the arcuate lengths of arcuate seating surfaces 59, 59a, 59b on holders 39, 39a, 39b, respectively. Of course, when magnet material elements 29, 29a, 29b are so adjustably moved into centered or located positions thereof on holders 39, 39a, 39b therefor, the engagements of wedges 71, 71a, 71b with the adjacent opposed ones of the opposite marginal edges 35, 35a, 35b and 37, 37a, 37b of the magnet material elements effects the movement or adjustment of arcuate outer surfaces 33, 33a, 33b on the magnet material elements generally about or circumferentially on arcuate seating surfaces 59, 59a, 59b on the holders while the surface-to-surface engagement therebetween is maintained by the magnetic coupling relation of permanent magnets 61, 61a, 61b with the magnet material elements, respectively. In this manner, magnet material elements 29, 29a, 29b are disposed in their centered positions with respect to holders 39, 39a, 39b, and aligned centers of the arcuate lengths of the magnet material elements and arcuate locating surfaces 59, 59a, 59b are also in radial alignment with preselected reference axis 57 of apparatus 21. It may be noted that the engagement between arcuate outer surfaces 33, 33a, 33b of magnet material elements 29, 29a, 29b and arcuate seats 59, 59a, 59b therefor may not be flush since the arcuate outer surface may have high points or areas thereon due to manufacturing tolerance variations in the magnet material elements; however, such locating engagements between the arcuate seats and the arcuate outer surfaces of the magnet material elements determine the effective outside diameter D of rotatable assembly 23 which will be uniform and controlled within close tolerances, as shown in FIG. 11 and discussed in greater detail hereinafter. Further, it is contemplated that the forces of the engagement between the adjacent opposed ones of the opposite marginal edges 35, 35a, 35b and 37, 37a, 37b of magnet material elements 29, 29a, 29b and wedges 71, 71a, 71b are relatively light being great enough to assure such engagement but not to cause fracture or effect cracking or chipping of the magnet material elements.

In response to continued movement of holders 39, 39a, 39b toward their assembly positions subsequent to the centering of the arcuate lengths of magnet material elements 29, 29a, 29b between wedges 71, 71a, 71b, as discussed above, the forces of the engagement between the adjacent opposed ones of opposite marginal edges 35, 35a, 35b and 37, 37a, 37b with the wedges are effective to adjustably displace or move at least some of the wedges both circumferentially and radially with respect to preselected reference axis 57 from the locating positions of the wedges toward their displaced or adjusting positions thereby to establish at least generally equal gaps G generally circumferentially between the adjacent opposite ones of the marginal edges of the magnet material elements, respectively, as may be seen in FIGS. 5–7. In this manner, the adjusting action of wedges 71, 71a, 71b is effective to readjust or reposition at least some of magnet material elements 29, 29a, 29b from their centered positions generally circumferentially with respect to circumferential surface 27 of rotor core 25 as well as preselected axis 57 of apparatus 21 to establish equal gaps G, and such readjustment of the magnet material elements occurs, of course, generally about the surface-to-surface engagement of arcuate outer surfaces 33, 33a, 33b thereof with arcuate seating surfaces 59, 59a, 59b of holders 39, 39a, 39b, respectively. Thus, the adjustable or driven movement of wedges 71, 71a, 71b into the adjusting positions thereof spaces apart at least generally equally the adjacent ones of opposite marginal edges 35, 35a, 35b and 37, 37a, 37b of magnet material elements 29, 29a, 29b to adjustably establish gaps G, and it may be noted that the establishment of gaps G in the manner discussed above is effective to compensate for any differences in the arcuate lengths within the preselected tolerance limits therefor of the magnet material elements, as illustrated in FIGS. 12A–12D and as discussed in greater detail hereinbelow.

With reference to FIGS. 11A–11D and 12A–12D, assume by way of example that the arcuate lengths between opposite marginal edges 35, 35a, 35b and 37, 37a, 37b of magnet material elements 29, 29a, 29b vary within preselected tolerance limits from a maximum of 120° to a minimum of 117° thereby to have a tolerance variation of 3°. Theoretically, of course, if the arcuate length of all these magnet material elements is 120°, as indicated, the magnet material elements should occupy the entire 360° of circumferential surface 27 of rotor 25 with the opposite marginal edges of the magnet material elements touching or engaging each other. It may be argued that the no gap situation of FIGS. 11A and 12A would never really occur due to the tolerance variation, but the fact remains that if no means is provided to prevent such a gap distribution, then it might occur. For convenience of discussion with respect to FIGS. 11B–11D and 12B–12D, a worst case gap distribution is shown therein with the gaps being accentuated for purpose of drawing simplicity. In FIGS. 11B and 12B, if two of the magnet material elements have minimum arcuate lengths while one has a maximum arcuate length, then a gap of 6° may occur between magnet material elements in the FIG. 11B illustration; however, in comparison therewith all of the gaps in the FIG. 12B illustration are equal, i.e., all are 2°. In FIGS. 11C and 12C, if two of the magnet material elements have maximum arcuate lengths while one has a minimum arcuate length, then a gap of 3° may occur in the FIG. 11C illustration; however, in comparison therewith, all of the gaps in the FIG. 12C illustration are equal, i.e., 1°. In FIGS. 11D and 12D, if all of the magnet material elements have minimum arcuate lengths of 117°, then a gap of 9° may occur between two of the magnet material elements in the FIG. 11D illustration; however, in comparison therewith, the gaps in the FIG. 14D illustration would again be equal or evenly distributed between the magnet material elements, i.e., 3°. Thus, in the light of the foregoing worst case illustrations, it may be noted that the adjusting action of wedges 71, 71a, 71b serves to establish equal gaps G between opposite marginal edges 35, 35a, 35b and 37, 37a, 37b of magnet material elements 29, 29a, 29b, respectively.

Upon the establishment of gaps G in response to the adjusting action of wedges 71, 71a, 71b, the movement of holders 39, 39a, 39b is terminated with the holders being disposed in the assembly positions thereof, and the wedges are retained in their adjusted positions so as to maintain the generally equal spacing between the adjacent opposed ones of opposite marginal edges 35, 35a, 35b and 37, 37a, 37b of magnet material elements 29, 29a, 29b engaged with the wedges, respectively. When holders 39, 39a, 39b are so advanced into the assembly positions thereof, arcuate seating surfaces 59, 59a, 59b on the holders are disposed with respect to each other in positions defining the predetermined outside diameter D of rotatable assembly 23, and arcuate outer surfaces 33, 33a, 33b of magnet material elements 29, 29a, 29b are retained in the surface-to-surface engagement thereof with the arcuate seating surfaces of the holders by the action of permanent magnets 61, 61a, 61b, respectively, as previously discussed. Further, the movement of holders 35, 35a, 35b into the advanced positions thereof also serves to space arcuate inner surfaces 31, 31a, 31b of magnet material elements 29, 29a, 29b within the preselected spatial range R from circumferential surface 27 of rotor core 25 in its located position with rotational axis 49 of the rotor core and shaft 47 aligned with preselected reference axis 57 of apparatus 21. Of course, arcuate inner surfaces 31, 31a, 31b of magnet material elements 29, 29a, 29b may also have high points or areas thereon due to manufacturing tolerance variations in the magnet material elements, but it may be noted that the arcuate inner surfaces of the magnet material elements are predeterminately spaced from circumferential surface 27 of rotor core 25 within preselected spatial range R when holders 39, 39a, 39b are in the advanced positions thereof, respectively, as illustrated in FIG. 7. It has been found that when the tolerance variations between arcuate inner surfaces 31, 31a, 31b and arcuate outer surfaces 33, 33a, 33b of magnet material elements 29, 29a, 29b are at a minimum so that the magnet material elements are relatively thin, the preselected spatial range R may be from generally about 0.002 inches to about 0.003 inches, and when the tolerance variations between the arcuate inner and outer surfaces of the magnet material elements are at a maximum so that the magnet material elements are relatively thick, then preselected spatial range R may be from generally about 0.020 inches to about 0.040 inches. While these variances in preselected spatial range R are believed to be effective in the formation of rotatable assembly 23, it is contemplated that other spatial ranges may be utilized within the scope of the invention so as to meet at least some of the objects thereof. Of course, this predetermined spacing between arcuate inner surfaces 31, 31a, 31b of magnet material elements 29, 29a, 29b and circumferential surface 27 of rotor core 25 obviates engagement therebetween to prevent fracturing, cracking or chipping of the magnet material elements and thereby compensates for the aforementioned tolerance variation between the arcuate inner surfaces and arcuate outer surfaces 33, 33a, 33b of the magnet material elements as well as tolerance variations which may occur in the concentricity of the circumferential surface of the rotor core.

Figure 10:
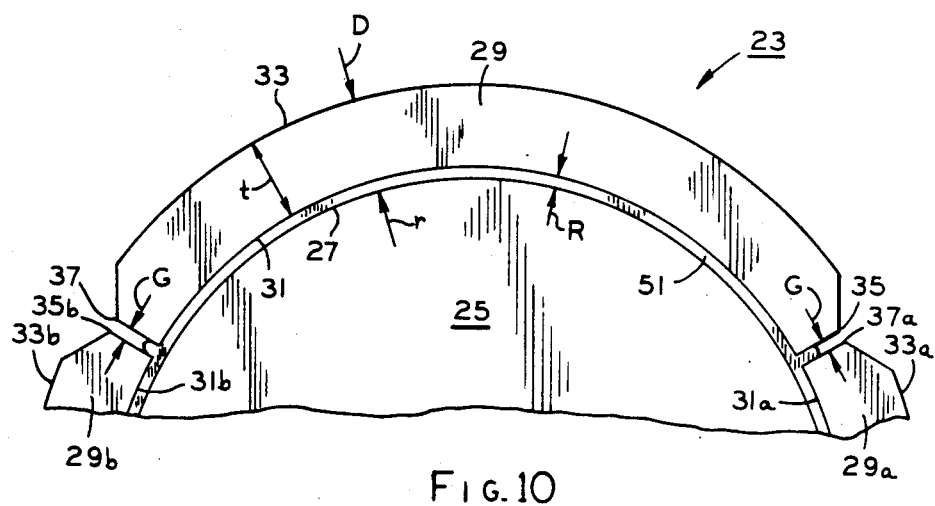
FIG. 10 is an enlarged partial view of the rotatable assembly upon the assembly thereof illustrating at least generally equal gaps circumferentially between the magnet material elements and the preselected spatial range between the arcuate inner surfaces of the magnet material elements and the circumferential surface of a rotatable member of the rotatable assembly, respectively.

Generally as arcuate inner surfaces 31, 31a, 31b, of magnet material elements 29, 29a, 29b are brought into the facing and spaced apart relation within the preselected spatial range R with circumferential surface 27 of rotor core 25, as mentioned above, the beads of hardenable adhesive material 51 on the arcuate inner surfaces of the magnet material elements contact the circumferential surface of the rotor core, and at least a part of the hardenable adhesive material is thereby displaced or flowed from the beaded configuration thereof so as to fill at least the spaces established between the circumferential surface of the rotor core and the arcuate inner surfaces of the magnet material elements, as best seen in FIGS. 7 and 10. As previously mentioned, circumferential surface 27 of rotor core 25 may be coated with an activator for hardenable adhesive material 51, and within a predetermined period of time after the hardenable adhesive material contacts the activator therefor on the circumferential surface of the rotor core, the hardenable adhesive material will set up or harden in place in the spaces established between arcuate inner surfaces 31, 31a, 31b of magnet material elements 29, 29a, 29b and the circumferential surface of the rotor core thereby to adhere thereto the magnet material elements, as illustrated in FIG. 10. Thus, with magnet material elements 29, 29a, 29b so adhered to rotor core 25 thereby to form rotatable assembly 23, it may be noted that arcuate outer surfaces 33, 33a, 33b of the magnet material elements in the surface-to-surface engagement thereof with arcuate seats 59, 59a, 59b on holders 39, 39a, 39b define the predetermined outside diameter D of the rotatable assembly and provide a generally constant outer circumferential surface therefor. Thus, regardless of the aforementioned tolerance variations between arcuate inner and outer surfaces 31, 31a, 31b and 33, 33a, 33b of magnet material elements 29, 29a, 29b, predetermined outside diameter D of rotatable assembly 23 is constant or uniform, accurate and very closely controlled.

Upon the hardening or curing of hardenable adhesive material 51 adhering or bonding magnet material elements 29, 29a, 29b to rotor core 25 thereby to form rotatable assembly 23, as discussed hereinabove, the rotatable assembly may be removed from apparatus 21 by manually lifting or otherwise displacing the rotatable assembly from the apparatus thereby to disassociate shaft end portion 53 from mounting device 55 therefor. While the placement of rotor core 25 and shaft 47 into the located position thereof in apparatus 21 and the removal of rotatable assembly 23 from the apparatus has been disclosed herein as being effected manually, it is contemplated that such placement and removal may be effected by various different transfer or robotic equipment associated with the apparatus within the scope of the invention so as to meet at least some of the objects thereof. To complete the description of the method of operating apparatus 21 to assemble rotatable assembly 23, cam plate 63 may be further operated to effect the rotation thereof in the direction opposite the directional arrow in FIG. 3 thereby to again drivingly engage cams 65, 65a, 65b with cam followers 67, 67a, 67b of holders 39, 39a, 39b from the advanced positions to the retracted or at-rest positions thereof, respectively. Thus, regardless of the tolerance variations in the circumferential surface 27 of rotor 25 as may be defined by radius r thereof and the tolerance variation in the thickness t of magnet material elements 29, 29a, 29b, it may be noted that the assembly method of the present invention automatically compensates for such tolerance variations so as to provide a uniform or constant outside diameter D on rotatable assembly 23, which outside diameter may be defined by the following equation:

$$D=2(t+r+R).$$

For instance, any tolerance variation in thickness t of any two of magnet material elements 29, 29a, 29b and any tolerance variation in radius r of rotor core 25 measured across any diameter of rotatable assembly 23 will be compensated for by the preselected spatial range R in which arcuate inner surfaces 31, 31a, 31b of magnet material elements 29, 29a, 29b are disposed with respect to circumferential surface 27 of the rotor core.

With reference again to the drawings in general and recapitulating at least in part with respect to the foegoing, there is shown apparatus 21 for assembling rotatable assembly 23 (FIGS. 1-9). Rotatable assembly 23 includes rotor core 25 and magnet material elements 29, 29a, 29b each having opposite marginal edges 35, 35a, 35b and 37, 37a, 37b defining the arcuate lengths thereof within preselected tolerance limits, and at least one of the magnet material elements has an arcuate length different than that of at least another of the magnet material elements within the preselected tolerance limit. Apparatus 21 comprises means, such as mounting device 55 or the like for instance, for disposing or locating rotor core 25 in a preselected position (FIG. 6). A set of means, such as for instance, holders 39, 39a, 39b or the like, are arranged to receive magnet material elements 29, 29a, 29b and are operable generally for moving the magnet material elements toward assembly positions with the arcuate lengths of the magnet material elements disposed generally circumferentially about rotor core 25 in the preselected position thereof, respectively (FIGS. 3-6). A set of means, such as wedges 71, 71a, 71b or the like for intance, are associated in engagement with the adjacent opposed ones of opposite marginal edges 35, 35a, 35b and 37, 37a, 37b of magnet material elements 29, 29a, 29b upon the movement of the magnet material elements toward the assembly positions thereof and are adjustably movable thereby toward adjusting or adjusted positions for spacing apart at least generally equally the adjacent opposed ones of the opposite marginal edges of the magnet material elements so as to compensate for the difference between the arcuate lengths of the aforementioned at least one magnet material element and the at least another magnet material element, respectively (FIGS. 3-9).

More particularly and with specific reference to FIGS. 2 and 7, apparatus 21 is provided with a base 73 having a generally circular opening 75 therethrough, and another opening 77 is generally centrally provided through the cam plate in which mounting device 53 is received with openings 73, 75 being generally in alignment. The details of base 73 as well as the details of the supporting and rotational association of cam plate 63 with the base are believed to be well known to the art and are omitted for purposes of drawing simplicity and brevity of disclosure.

Mounting means 55 comprises a bushing 79 predeterminately arranged or disposed in opening 77 of cam plate 63 of apparatus 21, and the centerline axis of a bore 81 of the bushing defines preselected reference axis 57 of the apparatus, as best seen in FIG. 6. Thus, when rotor core 25 and shaft 47 are disposed in the located position thereof in apparatus 21, shaft end portion 53 is received in locating engagement within bore 81 of bushing 79 thereby to align rotational axis 49 of the rotor core and shaft with preselected reference axis 57 of the apparatus. In order to locate rotor core 25 with respect to cam plate 63 so that circumferential surface 27 of the rotor core is disposed to receive, in the aforementioned spaced apart relation, magnet material elements 29, 29a, 29b carried by holders 39, 39a, 39b, respectively, an end face of the rotor core is engaged with an upper face of bushing which in effect defines an annular spacer 83 or the like for locating the rotor core. As previously mentioned, it is contemplated that various other means, such as transfer or robotic equipment for instance, may be associated with apparatus 21 instead of mounting means or device 55 to maintain rotor core 25 and shaft 47 in the located position thereof in the apparatus.

As best seen in FIGS. 3-6, cams or cam grooves 65, 65a, 65b provided in cam plate 63 have opposed sidewalls between which are received cam followers 67, 67a, 67b in driven engagement therewith, respectively. Cam followers 67, 67a, 67b each comprise a ball bearing 85 having its outer race slidably engaged between the aforementioned opposed sidewalls of cam grooves 65, 65a, 65b and its inner race received about a stud 87 therefor, respectively. Studs 87 extend through a set of slides 89, 89a, 89b into threaded engagement with holders 39, 39a, 39b, and the slides are reciprocally movable in sliding engagement between guides 69, 69a, 69b which are secured by suitable means to base 73 generally adjacent cam plate 73. Slides 89, 89a, 89b may be configured to provide a support or seating means for magnet material elements 29, 29a, 29b when they are disposed on holders 39, 39a, 39b therefor, and although the slides and holders are illustrated herein for purposes of disclosure as being separate pieces, it is contemplated that such slides and holders may be integral within the scope of the invention so as to meet at least some of the objects thereof. Further, it is also contemplated that cams and cam followers other than those illustrated herein for purposes of disclosure may be utilized within the scope of the invention so as to meet at least some of the objects thereof.

Figure 8:
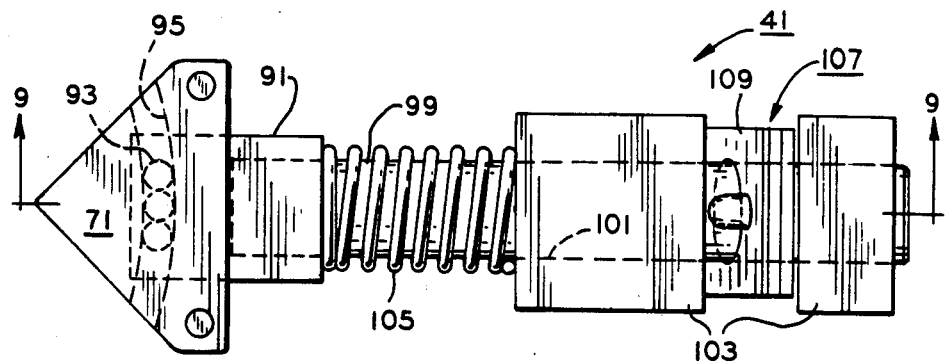
FIG. 8 is an enlarged plan view of apparatus i.e., one of the wedge means of FIG. 2, in one form of the invention.
Figure 9:
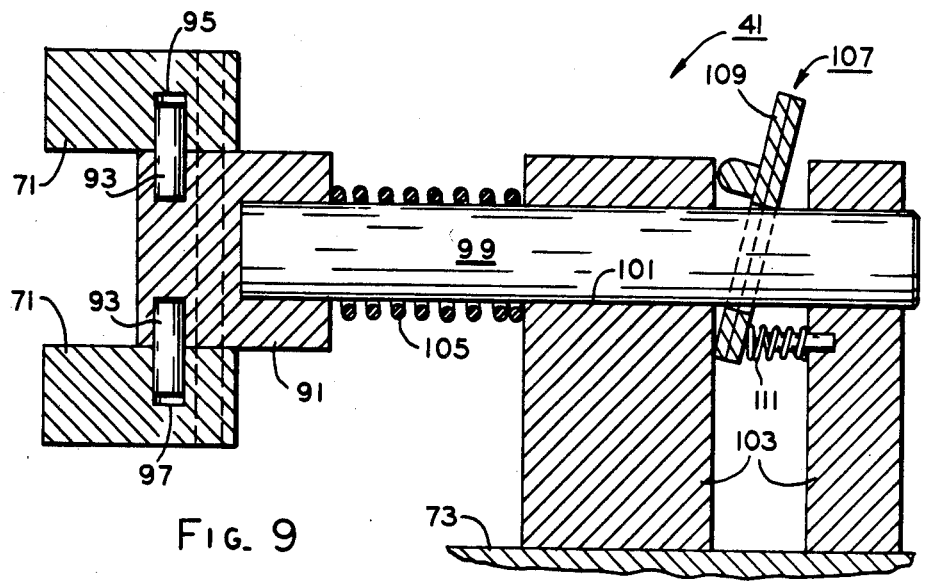
FIG. 9 is a sectional view taken along line 9—9 in FIG. 8.

In FIGS. 8 and 9, only positioning means 41 is shown for purposes of drawing simplicity, but the component parts of positioning means 41a and 41b are discussed hereinafter along with the component parts of positioning means 41. Positioning means 41, 41a, 41b respectively define apparatus in one form of the invention for use in assembling rotatable assembly 23. Wedges 71, 71a, 71b of positioning or spacing means 41, 41a, 41b are adjustably carried on a set of means, such as for instance supports or mounting blocks 91, 91a, 91b, for mounting the wedges, and a set of arc pins 93, 93a, 93b are slidably arranged or movable in a set of opposed arcuate slots or grooves 95, 95a, 95b and 97, 97a, 97b having generally the same configuration which are respectively provided in the wedges and the mounting means or mounting blocks for defining the circumferential or pivotal adjusting movement of the wedges. It may be noted that the arcs of arcuate slots 95, 95a, 95b and 97, 97a, 97b are predeterminately configured so as to be at least generally concentric with preselected reference axis 57 of apparatus 21 and thereby also with respect to circumferential surface 27 of rotor core 25 when shaft end portion 53 is received in mounting 55 thereby to locate rotor core 25 and shaft 47 in the preselected position therefor in the apparatus. A set of guide rods 99, 99a, 99b are reciprocally or slidably movable or displaceable in a set of bores 101, 101a, 101b provided in a set of split supports or supporting means 103, 103a, 103b which are mounted by suitable means in preselected locations therefor on base 83 generally about cam plate 63. Mounting blocks 91, 91a, 91b are fixedly connected by suitable means to free end portions of guide rods 99, 99a, 99b so as to be conjointly reciprocally movable therewith, and a set of resilient means, such as springs 105, 105a, 105b or the like for instance are carried on the guide rods and biased between the mounting blocks and supports 103, 103a, 103b for urging wedges 71, 71a, 71b toward the at-rest or locating positions thereof, respectively. It may be noted that guide rods 99, 99a, 99b are at least generally arranged in radial alignment with respect to preselected reference axis 57 of apparatus 21 so that the movement of the guide rods against the compressive forces of springs 105, 105a, 105b is radially directed so as to define the radial adjusting movement of wedges 71, 71a, 71b, respectively. Thus, it may also be noted that arc pins 93, 93a, 93b and arcuate grooves 95, 95a, 95b and 97, 97a, 97b of wedges 71, 71a, 71b and mounting blocks 91, 91a, 91b not only define the circumferential adjustable movement of the wedges but also effect the radial adjustable movement of the wedges which is conjoint with the radial movement of guide rods 99, 99a, 99b, respectively. To complete the description of positioning means 41, 41a, 41b and apparatus 21, a set of means, such as ratchet devices 107, 107a, 107b or the like for instance, are provided for releasable engagement with guide rods 99, 99a, 99b so as to releasably retain the guide rods against return movement from the displaced position thereof against the compressive forces of springs 105, 105a, 105b, as discussed in greater detail hereinafter. Ratchet devices 107, 107a, 107b include a set of tiltable or pivotable washers 109, 109a, 109b carried on guide rods 99, 99a, 99b between split supports 103, 103a, 103b and resiliently or tiltably urged by a set of ratchet springs 111, 111a, 111b toward releasable gripping engagement with the guide rods in a manner well known to the art. Although ratchet devices 107, 107a, 107b are illustrated herein for purposes of disclosure, it is contemplated that various other types of ratchet devices may be utilized with positioning means 41, 41a, 41b within the scope of the invention so as to meet at least some of the objects thereof.

In the operation of apparatus 21, assume that the component parts thereof are in the positions illustrated in FIG. 2 and that rotor core 25 and shaft 47 are in the located position thereof in the apparatus thereby to effect the alignment of rotational axis 49 of the rotor core and shaft with preselected reference axis 57 of the apparatus as best seen in FIG. 6 and as previously discussed. When magnet material elements 29, 29a, 29b with hardenable adhesive material 51 applied thereto are placed in holders 39, 39a, 39b therefor in the at-rest positions thereof, the magnet material elements are supported on slides 89, 89a, 89b, and arcuate outer surfaces 33, 33a, 33b of the magnet material elements are attracted by permanent magnets 61, 61a, 61b into the surface-to-surface engagement thereof with arcuate seats 59, 59a, 59b of the holders, respectively, as best seen in FIG. 3.

Cam plate 63 is rotated through a preselected arc or angle of rotation in the direction of the rotational arrow in FIG. 3, and in response to such rotation of the cam plate, cams 65, 65a, 65b thereof are drivingly engaged with cam followers 67, 67a, 67b to move or drive holders 39, 39a, 39b from the at-rest positions toward the assembly positions thereof, respectively. Of course, slides 89, 89a, 89b associated with holders 39, 39a, 39b are in sliding engagement with guides 69, 69a, 69b thereby to direct the movement of the holders generally radially with respect to preselected reference axis 57 of apparatus 21. As best seen in FIG. 5, during the movement of holders 39, 39a, 39b toward the assembly positions thereof, the adjacent opposed ones of opposite marginal edges 35, 35a, 35b and 37, 37a, 37b of magnet material elements 29, 29a, 29b are initially engaged with wedges 71, 71a, 71b of positioning means 41, 41a, 41b thereby to insure that the arcuate lengths of the magnet material elements are centered between the wedges, respectively, as previously discussed. Thereafter, in response to continued cam driven movement of holders 39, 39a, 39b toward their assembly positions, the forces of the engagement between the adjacent opposed ones of opposite marginal edges 35, 35a, 35b and 37, 37a, 37b with wedges 71, 71a, 71b are effective to cause the adjustable movement of at least some of the wedges toward their adjusting positions thereby to establish the equal gaps G between the adjacent opposed ones of the opposite marginal edges of the magnet material elements, respectively. For instance, any differential between the opposing forces of the engagements between the adjacent opposed ones of opposite marginal edges 35, 35a, 35b and 37, 37a, 37b with wedges 71, 71a, 71b will effect the circumferential adjustable movement of the wedges toward their adjusting positions through the sliding or guidable association of arc pins 93, 93a, 93b within arcuate slots 95, 95a, 95b and 97, 97a, 97b of the wedges and mounting blocks 91, 91a, 91b therefor, respectively. Since the adjacent opposed ones of opposite marginal edges 35, 35a, 35b and 37, 37a, 37b of magnet material elements 29, 29a, 29b are engaged with wedges 71, 71a, 71b, circumferential adjustable movement of the wedges is effective to drive or adjustably reposition the magnet material elements generally circumferentially with respect to circumferential surface 27 of rotor core 25 as well as preselected reference axis 57 of apparatus 21. Whether any one or more of wedges 71, 71a, 71b are circumferentially adjustably movable, as discussed above, is dependent, of course, upon the respective arcuate lengths of magnet material elements 29, 29a, 29b within the preselected tolerance limits. Simultaneously with the above discussed adjustable repositioning of magnet material elements 29, 29a, 29b in response to the circumferential adjustable movement of wedges 71, 71a, 71b, the wedges are also radially adjustably movable toward their assembly positions. For instance, it may be noted that a wedging action is created upon the engagements of the adjacent opposed ones of opposite marginal edges 35, 35a, 35b and 37, 37a, 37b with wedges 71, 71a, 71b in response to the continued movement of holders 39, 39a, 39b toward their assembly positions. This wedging action is effective to drive wedges 71, 71a, 71b radially outwardly from the at-rest positions toward the adjusting positions thereof against the compressive forces of springs 105, 105a, 105b of positioning means 41, 41a, 41b, respectively. Of course, as previously mentioned, this radial adjustable movement of wedges 71, 71a, 71b concurrently slides guide rods 99, 99a, 99b in bores 101, 101a, 101b of split supports 103, 103a, 103b thereby to predetermine the radial adjustable movement of the wedges toward the adjusting positions thereof, respectively. Ratchet devices 107, 107a, 107b are operative to permit or accommodate the conjoint radial adjustable movement of wedges 71, 71a, 71b and guide rods 99, 99a, 99b, as discussed above, and it may be noted that springs 111, 111a, 111b bias washers 109, 109a, 109b of the ratchet devices into releasable gripping engagement with the guide rods thereby to retain the wedges in their adjusting positions obviating return movement of the wedges in response to the compressive forces of return springs 105, 105a, 105b exerted thereon, respectively. Thus, ratchet devices 107,1 07a, 107b in the aforementioned releasable engagement thereof with guide rods 99, 99a, 99b are operative to maintain wedges 71, 71a, 71b in their adjusting positions. Upon both the circumferential and radial adjustable movement of wedges 71, 71a, 71b from the at-rest position to the adjusting positions thereof in response to the forces of the engagements between the adjacent opposed ones of opposite marginal edges 35, 35a, 35b and 37, 37a, 37b of magnet material elements 29, 29a, 29b and the wedges when holders 39, 39a, 39b are moved toward their assembly positions, it may be noted that at least some of the magnet material elements are adjustably repositioned generally circumferentially with respect to circumferential surface 27 of rotor core 25 thereby to establish the equal gaps G between the adjacent opposed ones of the opposite marginal edges of the magnet material elements. Additionally, it may also be noted that the aforementioned adjustable repositioning of magnet material elements 29, 29a, 29b upon the adjusting action of wedges 71, 71a, 71b also compensates for any difference in arcuate length within the preselected tolerance limits between the magnet material elements wherein the equal gaps G are established irrespective of arcuate length difference between the magnet material elements.

If by chance all of the magnet material elements 29, 29a, 29b were of equal arcuate lengths, then in this instance, wedges 71, 71a, 71b may be only radially adjustably movable toward their adjusting positions. With the arcuate lengths of magnet material elements 29, 29a, 29b equal, as assumed above, the forces exerted by the adjacent opposed ones of opposite marginal edges 35, 35a, 35b and 37, 37a, 37b on wedges 71, 71a, 71b upon the movement of holders 39, 39a, 39b toward their assembly positions would be generally equal and opposite thereby to obviate any circumferential adjustable movement of the wedges, and in this instance, the only wedging action of the magnet material elements and the wedges occurs whereby the wedges are driven only radially toward their adjusting positions against the compressive forces of springs, 105, 105a, 105b of positioning means 41, 41a, 41b, as discussed above.

Upon the rotation of cam plate 63 through the preselected rotational angle thereof, the ends of cam grooves 65, 65a, 65b becomes engaged with cam followers 67, 67a, 67b of holders 39, 39a, 39b thereby to predeterminately terminate the movement of the holders in the advanced or assembly positions thereof with respect to circumferential surface 27 of rotor core 25 in its preselected position in apparatus 21, respectively. Of course, wedges 71, 71a, 71b are in the adjusting positions thereof, as previously discussed, when holders 39, 39a, 39b are in their advanced positions, respectively. Thus, the adjusting action of wedges 71, 71a, 71b serves to establish the equal gaps G between magnet material elements 29, 29a,29 b, and arcuate inner surfaces 31, 31a, 31b of the magnet material elements are disposed within the preselected spatial range R from circumferential surface 27 of rotor core 25 when holders 39, 39a, 39b are in the advanced positions thereof while arcuate outer surfaces 33, 33a, 33b of the magnet material elements are arranged to establish the preselected outside diameter D of rotatable assembly 23, as previously discussed. In this manner, upon the curing or hardening adhesive material 51 filling at least the spaces between arcuate inner surfaces 31, 31a, 31b of magnet material elements 29, 29a, 29b and circumferential surface 27 of rotor core 25 in its preselected position in apparatus 21, the magnet material elements are adhered to the rotor core thereby to complete the formation or assembly of rotatable assembly 23. With magnet material elements 29, 29a, 29b so adhered to rotor core 25, rotatable assembly may be removed from apparatus 21 thereby to disassociate shaft end portion 53 from bore 81 of bushing 79. Cam plate 63 may be further actuated to return it through the rotational angle thereby to effect the return movement of holders 39, 39a, 39b from the advanced positions to the at-rest positions thereof through the driving engagements of cam grooves 65, 65a, 65b with cam followers 67, 67a, 67b of the holders, and ratchet devices 107, 107a, 107b may be pivotally moved against ratchet springs 111, 111a, 111b thereby to release the gripping engagement of the ratchet devices with guide rods 99, 99a, 99b. To complete the operation of apparatus 21, upon the release of ratchet devices 107, 107a, 107b from the gripping engagement thereof with guide rods 99, 99a, 99b, the compressive forces of return springs 105, 105a, 105b are effective to return wedges 71, 71a, 71b to the at-rest positions thereof, respectively.

Figure 13:
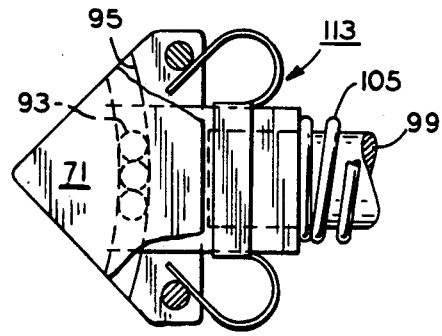
FIG. 13 is a partial plan view taken from FIG. 8 showing an alternative construction in one form of the invention of the apparatus shown therein.

As alternatively shown in FIG. 13, resilient means, such as for instance a spring clip 113, 113a, 113b or the like, may be supported in mounting engagement with mounting blocks 91, 91a, 91b and arranged in biasing engagement with wedges 71, 71a, 71b of each positioning means 41, 41a, 41b thereby to maintain the wedges generally centered when the wedges are in the at-rest positions thereof, respectively.

With reference again to the drawings in general and recapitulating at least in part with respect to the foregoing, there is shown rotatable assembly 23 having at least one rotatable member, such as for instance rotor core 25, with circumferential surface 27 (FIG. 1). Magnet material elements 29, 29a, 29b are arranged about circumferential surface 27 of rotor core 25 and include: generally arcuate outer surfaces 33, 33a, 33b defining a constant outer circumference of rotatable assembly 23; generally arcuate inner surfaces 31, 31a, 31b spaced within preselected spatial range R from circumferential surface 27 of rotor core 25; and generally opposite marginal edges 35, 35a, 35b and 37, 37a, 37b interposed between the arcuate inner and outer surfaces and defining the arcuate lengths of the magnet material elements with the adjacent opposed ones of the opposite marginal edges of the magnet material elements being spaced equally apart from each other, respectively (FIGS. 7 and 10). Hardenable adhesive material 51 fills at least the spaces between arcuate inner surfaces 31, 31a, 31b and circumferential surface 27 of rotor core 25 so as to adhere together the magnet material elements and the rotor core, respectively (FIG. 10).

There is also illustrated a method of assembling rotatable assembly 23 (FIGS. 1–7). Rotatable assembly has rotor core 25 with circumferential surface 27 thereon and magnet material elements 29, 29a, 29b (FIG. 1). Magnet material elements 29, 29a, 29b include generally arcuate inner and outer surfaces 31, 31a, 31b and 33, 33a, 33b interposed between opposite marginal edges 35, 35a, 35b and 37, 37a, 37b defining the arcuate lengths of the magnet material elements within the preselected tolerance limits and with the arcuate length of at least one of the magnet material elements being different than that of at least another of the magnet material elements, respectively (FIG. 1). In practicing this method, magnet material elements 29, 29a, 29b are moved toward assembly positions with respect to circumferential surface 27 of rotor core 25, and arcuate inner surfaces 31, 31a, 31b of the magnet material elements are spaced within preselected spatial range R from the circumferential surface of the rotor core when the magnet material elements are in the assembly positions thereof, respectively (FIGS. 3–6). At least some of magnet material elements 29, 29a, 29b are adjusted generally circumferentially with respect to circumferential surface 27 of rotor core 25, and thereby the adjacent opposed ones of opposite marginal edges 35, 35a, 35b and 37, 37a, 37b of the magnet material elements are spaced apart to establish at least generally equal gaps G therebetween so as to compensate for the arcuate length difference between the aforementioned at least one magnet material element and the at least another magnet material element, respectively (FIGS. 7 and 10).

From the foregoing, it is now apparent that a novel apparatus has been presented meeting the objects set out hereinbefore as well as others, and it is contemplated that changes as to the present arrangements, shapes, details and connections of the component parts utilized in such apparatus rotatable assembly may be made by those having ordinary skill in the art without departing from the spirit of the invention or from the scope of the invention as set out in the claims which follow.

What I claim as new and desire to secure by Letters Patent of the United States is:

1. Apparatus comprising:
   a support having a pair of spaced apart sections;
   a bore in at least one of said sections;
   a guide rod reciprocally movable in said bore in one direction and another direction opposite thereto and having a free end portion spaced from one of said at least one section and the other of said sections of said support;
   a mounting block secured to the free end portion of said guide rod and reciprocally movable therewith, said mounting block including at least one arcuate groove therein;
   a spring disposed about said guide rod and biased between said mounting block and said one of said at least one section and said other section of said support thereby to oppose the reciprocal movement of said guide rod in one of the one and another directions;
   a wedge device adapted for pivotal movement relative to said mounting block and conjoint movement therewith upon the reciprocal movement of said guide rod in the one and another directions, and said wedge device including at least another arcuate groove therein having a configuration at least generally the same as that of said at least one arcuate groove in said mounting block and arranged generally opposite said at least one arcuate groove; and
   at least one arc pin slidably received within said oppositely arranged at least one arcuate groove in said mounting block and said at least another arcuate groove in said wedge device thereby to accommodate the pivotal movement of said wedge device relative to said mounting block and to effect the conjoint reciprocal movement of said wedge device with said mounting block upon the reciprocal movement of said guide rod in the one and another directions.

2. The apparatus as set forth in claim 1 further comprising means releasably associated in gripping engagement with said guide rod for retaining said guide rod against the compressive force or said spring upon the reciprocal movement of said guide rod in the one of the one and another directions.

3. Apparatus comprising:
   a support having a bore therein;
   a guide rod reciprocally movable in said bore in one direction and another direction opposite thereto and having a free end portion extending from said bore;
   a mounting block secured to said free end portion of said guide rod for conjoint reciprocal movement therewith andd including at least one arcuate groove therein;
   a spring disposed about said guide rod and biased between said support and said mounting block thereby to oppose the reciprocal movement of said guide rod in one of the one and another directions;
   wedge means associated with said mounting block and adapted for conjoint reciprocal movement therewith and for pivotal movement relative thereto, said wedge means including at least another arcuate groove having a configuration generally corresponding to that of said at least one arcuate groove in said mounting block; and at least one arc pin slidably interconnected between said at least one arcuate groove of said mounting block and said at least another arcuate groove in said wedge means for accommodating the pivotal movement of said wedge means relative to said mounting block and for effecting the conjoint reciprocal movement of said wedge means with said mounting block.

4. Apparatus comprising:

a support;

means associated with said support and adapted for reciprocal movement in one direction and another direction opposite the one direction;

resilient means operable generally for opposing the movement of said reciprocal movement means in one of the one and another directions;

wedge means adapted for conjoint movement with said reciprocal movement means and for pivotal movement relative to said reciprocal movement means;

means associated with said wedge means and said reciprocal movement means for accommodating both the pivotal movement of said wedge means relative to said reciprocal movement means and the conjoint movement of said wedge means with said reciprocal movement means;

means for mounting said wedge means to said reciprocal movement means; and said mounting means and said wedge means including at least a pair of generally opposed arcuate grooves therein, and said accommodating means including at least one arc pin slidably arranged in said opposed arcuate grooves, respectively.

5. The apparatus as set forth in claim 4 further comprising means for releasably retaining said reciprocal movement means against movement in the other of the one and another directions in response to the operation of said resilient means.

6. The apparatus as set forth in claim 4 wherein said resilient means includes a spring associated with said reciprocal movement means and biased between said support and said mounting means.

7. Apparatus comprising:

a support;

means associated with said support and operable generally for reciprocal movement in one direction and another direction opposite thereto;

resilient means associated with said support and said reciprocal means and operable generally for opposing the movement of said reciprocal movement means in one of the one and another directions;

wedge means associated with said reciprocal movement means for conjoint movement therewith and for pivot movement relative thereto;

means associated with said wedge means and said reciprocal movement means for accommodating both the pivotal movement of said wedge means relative to said reciprocal movement means and the conjoint movement therewith of said wedge means; and means associated with said support and said reciprocal movement means and operable generally for releasably retaining said reciprocal movement means against movement in the other of the one and another direction in response to the operation of said resilient means.

* * * * *